United States Patent
Ren et al.

(10) Patent No.: US 8,553,515 B2
(45) Date of Patent: Oct. 8, 2013

(54) SYSTEM AND METHOD FOR PRECISE SERVOING

(75) Inventors: Zhiyuan Ren, Malta, NY (US); Xiaolei Shi, Schenectady, NY (US); Xuefeng Wang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/957,179

(22) Filed: Nov. 30, 2010

(65) Prior Publication Data

US 2012/0134251 A1    May 31, 2012

(51) Int. Cl.
| | |
|---|---|
| G11B 7/0065 | (2006.01) |
| G11B 7/1353 | (2012.01) |
| G11B 7/126 | (2012.01) |
| G11B 19/12 | (2006.01) |
| G11B 20/18 | (2006.01) |

(52) U.S. Cl.
USPC .................. 369/103; 369/44.23; 369/112.15; 369/47.5; 369/53.23; 369/53.28; 369/44.25; 369/47.45; 369/53.35

(58) Field of Classification Search
USPC ............. 369/103, 112.1, 112.15, 47.5, 53.23, 369/53.28, 44.1, 44.25, 47.45, 53.35
See application file for complete search history.

(56) References Cited

U.S. PATENT DOCUMENTS

| | | | |
|---|---|---|---|
| 6,590,843 B1 | 7/2003 | Zhuang | |
| 6,729,541 B1 * | 5/2004 | Kurokawa et al. | 235/454 |
| 7,706,233 B2 | 4/2010 | Horimai et al. | |
| 2002/0089906 A1 | 7/2002 | Faucett | |
| 2005/0286386 A1 * | 12/2005 | Edwards et al. | 369/103 |
| 2007/0140091 A1 | 6/2007 | Lin et al. | |
| 2008/0094975 A1 | 4/2008 | Lee | |
| 2009/0168629 A1 | 7/2009 | Bae et al. | |
| 2009/0296542 A1 | 12/2009 | Miyamoto et al. | |
| 2009/0303849 A1 * | 12/2009 | Nakatani et al. | 369/47.53 |
| 2010/0195177 A1 | 8/2010 | Yoshinari et al. | |
| 2011/0134729 A1 | 6/2011 | Ishimoto | |

FOREIGN PATENT DOCUMENTS

| | | |
|---|---|---|
| EP | 2105925 A1 | 9/2009 |
| EP | 2182515 A1 | 5/2010 |

OTHER PUBLICATIONS

Search Report from corresponding GB Application No. GB1119448.7 dated Feb. 15, 2012.
Search Report from corresponding GB Application No. GB1119448.7 dated Jun. 22, 2012.

* cited by examiner

*Primary Examiner* — Aneeta Yodichkas
(74) *Attorney, Agent, or Firm* — Joseph J. Christian

(57) ABSTRACT

A method for servoing when reading out a recorded holographic disk or recording in a preformatted disk includes detecting a primary signal of a reflected primary beam from a target data track of a target data layer of the disk, wherein the primary beam of radiation has a first wavelength; comparing a power measurement of the primary signal with a threshold value of power; detecting a tracking signal of a reflected tracking beam from a reference layer of the disk in an event that the power measurement of the primary signal is below the threshold value, wherein the tracking beam of radiation has a second wavelength; generating a servo error signal based upon the primary signal or the tracking signal; actuating an optical sub-system based upon either of the primary servo error signal or the tracking servo error signal such that the primary beam focuses on the target data layer.

14 Claims, 4 Drawing Sheets

SYSTEM AND METHOD FOR PRECISE SERVOING

BACKGROUND

The present techniques relate generally to bit-wise holographic data storage techniques. More specifically, the techniques relate to methods and systems for parallel replication in holographic disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disk, developed in the early 1980s, has a capacity of around 650-700 MB of data, or around 74-80 minutes of a two channel audio program. In comparison, the digital versatile disk (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. For example, holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, currently there does not exist an accurate technique to focus directly on data layers due to events of no reflection signal being obtained, when a laser focuses in between tracks on the data layer. Hence, there is a need for such a technique whereby a servo signal may be detected during such a blackout.

BRIEF DESCRIPTION

In accordance with an embodiment of the invention, a method for servoing when reading out a recorded holographic disk or recording in a preformatted holographic disk is disclosed. The method includes detecting a primary signal of a reflected primary beam from a target data track of a target data layer of the holographic disk, wherein the primary beam of radiation has a first wavelength. The method also includes comparing power of the primary signal with a threshold value of power. The method also includes detecting a tracking signal of a reflected tracking beam from a reference layer of the holographic disk in an event that the power of the primary signal is below the threshold value of power, wherein the tracking beam of radiation has a second wavelength different from the first wavelength. The method also includes generating a servo error signal based upon either of the primary signal or the tracking signal. The method further includes actuating an optical sub-system based upon either of the primary servo error signal or the tracking servo error signal such that the primary beam focuses on the target data layer.

In accordance with another embodiment of the invention, a system for servoing when reading out a recorded holographic disk or recording in a preformatted holographic disk is provided. The system includes a first detector configured to detect a primary signal of a reflected primary beam from a target data track of a target data layer of the holographic disk, wherein the primary beam has a first wavelength. The system also includes a second detector configured to detect a tracking signal of a reflected tracking beam from a reference layer of the holographic disk, wherein the tracking beam has a second wavelength different from the first wavelength. The system also includes a processing sub-system that includes a comparator configured to compare a power measurement of the primary signal with a threshold value of power. The processing sub-system also includes at least one servo error generator configured to generate either a primary servo error signal based on the primary signal or a tracking servo error signal based on the tracking signal. The processing sub-system further includes a servo controller configured to either generate an actuation signal based on the primary servo error signal in an even that the power measurement is greater than or equal to the threshold value, or generate an actuation signal based on the tracking servo error signal in an event that the power measurement is lesser than the threshold value. The system further includes an optical sub-system configured to actuate based upon the actuation signal such that the primary beam focuses on the target data layer.

In accordance with another embodiment of the invention, a method for servoing when reading out a recorded holographic disk or recording in a preformatted holographic disk is provided. The method includes detecting a tracking signal of a reflected tracking beam from a reference layer of the holographic disk, wherein the tracking beam of radiation has a first wavelength and the reference layer has at least one of a partially dichroic coating or a partially metallized coating. The method also includes generating a tracking servo error signal based on the tracking signal. The method also includes obtaining a tracking run-out profile based upon the tracking servo error signal. The method also includes actuating an optical sub-system based upon the tracking servo-error signal such that the tracking beam focuses on the reference layer. The method also includes detecting a primary signal of a reflected primary beam of radiation from a target data layer of the holographic disk, wherein the primary beam of radiation has a second wavelength different from the first wavelength of the tracking beam of radiation. The method also includes generating a primary servo error signal based on the primary signal. The method further includes actuating the optical sub-system to focus the primary beam on the data layer based upon the primary servo-error signal and the obtained tracking run-out profile.

In accordance with another embodiment of the invention, a system for servoing when reading out a recorded holographic disk or recording in a preformatted holographic disk is provided. The system includes a first detector configured to detect a tracking signal of a reflected tracking beam from a reference layer of the holographic disk, wherein the tracking beam of radiation has a first wavelength and the reference layer includes at least one of a partially dichroic coating or a partially metallized coating. The system also includes a second detector configured to detect a primary signal of a reflected primary beam of radiation from a target data layer of the holographic disk, wherein the primary beam of radiation has a second wavelength different from the first wavelength of the tracking beam of radiation. The system also includes a processing sub-system coupled to the first detector and the second detector. The processing sub-system includes at least one servo error generator configured to generate either a primary servo error signal based on the primary signal or a tracking servo error signal based on the tracking signal. The processing sub-system also includes a tracking servo controller configured to generate a tracking actuation signal and a tracking run-out profile based on the tracking servo error signal. The processing sub-system also includes a primary servo controller configured to generate a primary actuation signal based on the primary servo error signal and the tracking run-out profile. The system also includes an optical sub-system configured to actuate based upon the primary actuation signal and the tracking actuation signal, and focus the primary beam on the target data layer based upon the obtained tracking run-out profile.

DRAWINGS

These and other features, aspects, and advantages of the present invention will become better understood when the following detailed description is read with reference to the accompanying drawings in which like characters represent like parts throughout the drawings, wherein.

Figure 4:
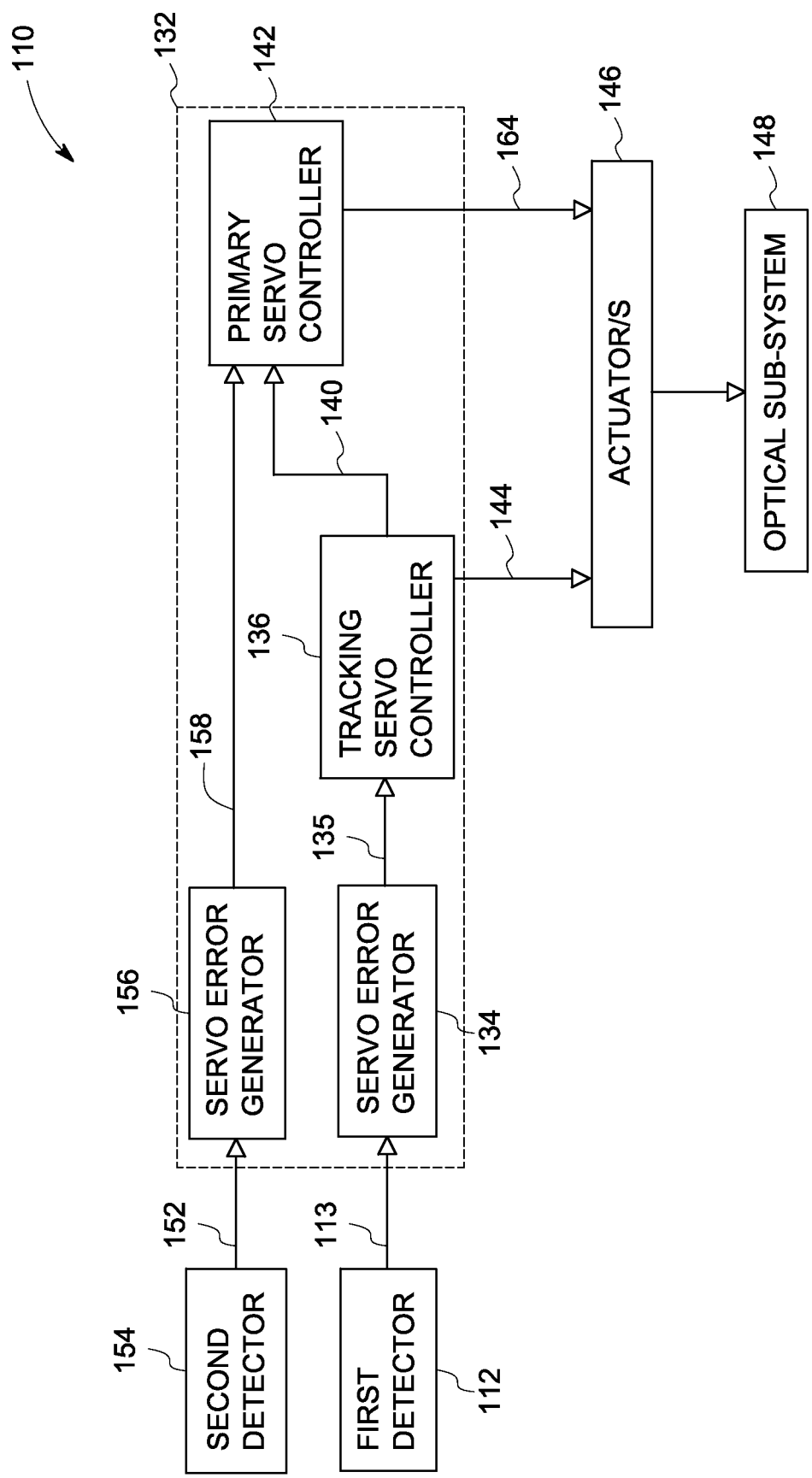

FIG. 4 a block diagram representation of another exemplary system 110 for servoing when reading out a recorded holographic disk or recording in a preformatted holographic disk in accordance with an embodiment of the invention.

Figure 5:
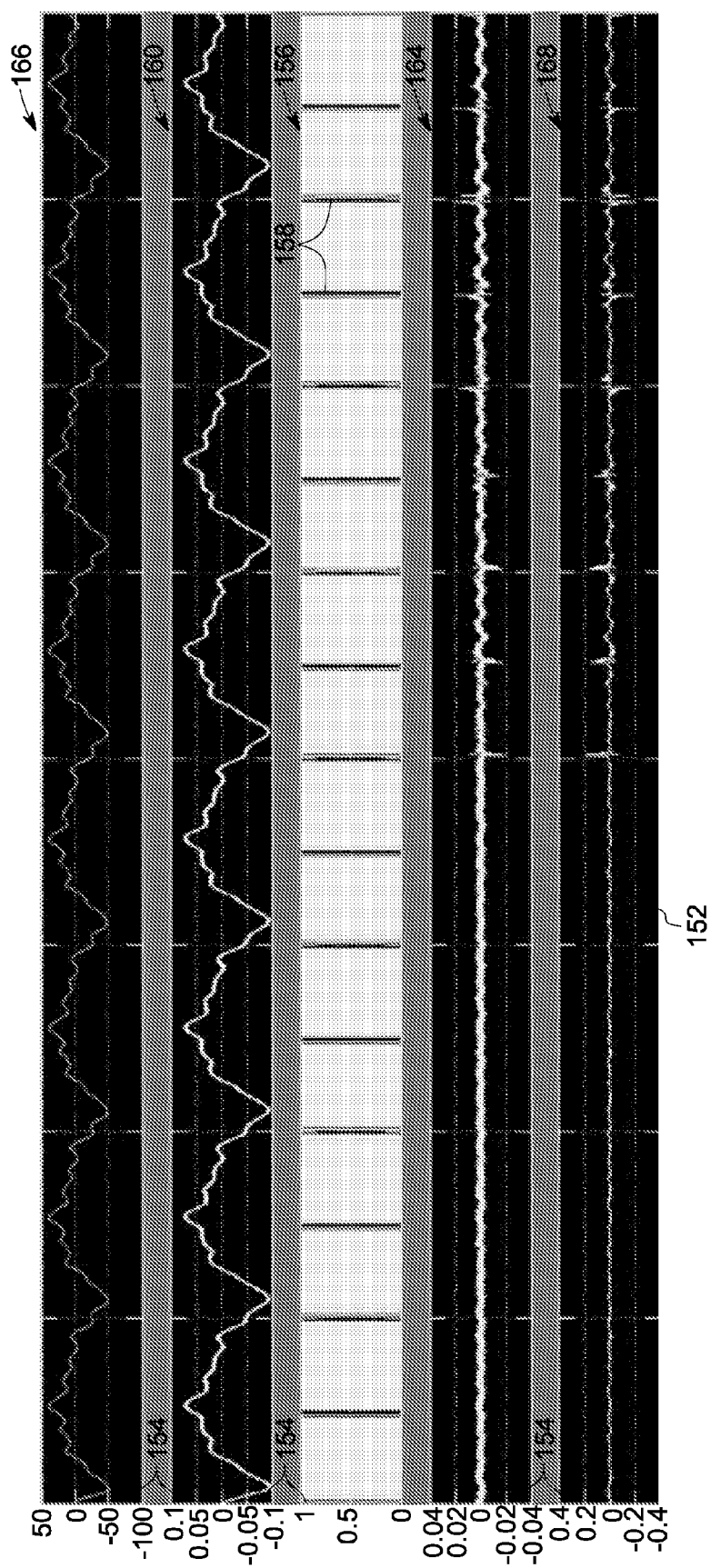

FIG. 5 is a graphical illustration of an exemplary simulated run-out profile obtained in the system of FIG. 4.

DETAILED DESCRIPTION

As discussed in detail below, embodiments of the invention include a system and method for precise servoing. The system and method include techniques that enable direct focusing of the laser over the data layers/tracks of the holographic disk, eliminating blackout periods. As used herein, the term 'blackout' refers to time periods when a reflection signal from a reflected primary beam is not present due to the laser focusing on areas in between tracks on the data layer or between layers. The term 'primary beam' refers to a reading beam for reading-out the recorded holographic disk or a recording beam for recording by erasure in the preformatted holographic disk.

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
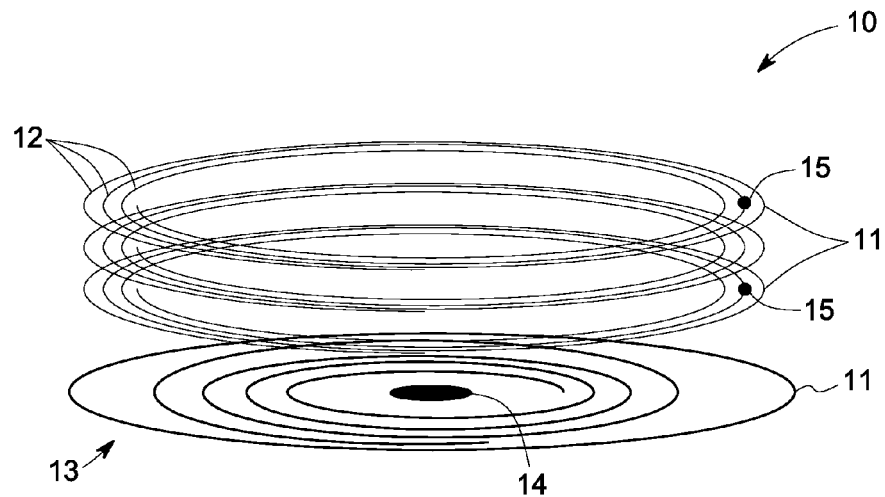
FIG. 1 is a schematic illustration of an exemplary holographic data storage disk in accordance with an embodiment of the invention.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a round, substantially planar disk with one or more data storage layers 11 embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material, which is responsive to the illumination intensity of light beams impinged on the disk 10. For example, in different embodiments, the disk 10 materials may be threshold responsive or linearly responsive. The data layers may be between approximately 0.05 µm to 5 µm in thickness and may have a separation between approximately 0.5 µm to 250 µm. The reference layer 13 includes a partially dichroic coating or a partially metallized coating or both, and is referenced to in FIGS. 3-5.

Data in the form of micro-holograms 15 may be generally stored in a sequential spiraling track or tracks 12 in the information area from the outer edge of the disk 10 to an inner limit, although concentric circular or spiral tracks, or other configurations, may be used. A spindle hole 14 may be sized to engage about a spindle in a holographic system, such that the disk 10 may be rotated for data recording and/or reading. The rotation of the spindle may be controlled by a feedback system to maintain a constant linear velocity or a constant angular velocity during the recording and/or reading process. Moreover, the disk spindle, the recording optics, and/or the reading optics may be moved by a translation stage or sled in a radial direction of the disk to allow the optical system to record or read across the entire radius of the disk.

Figure 2:
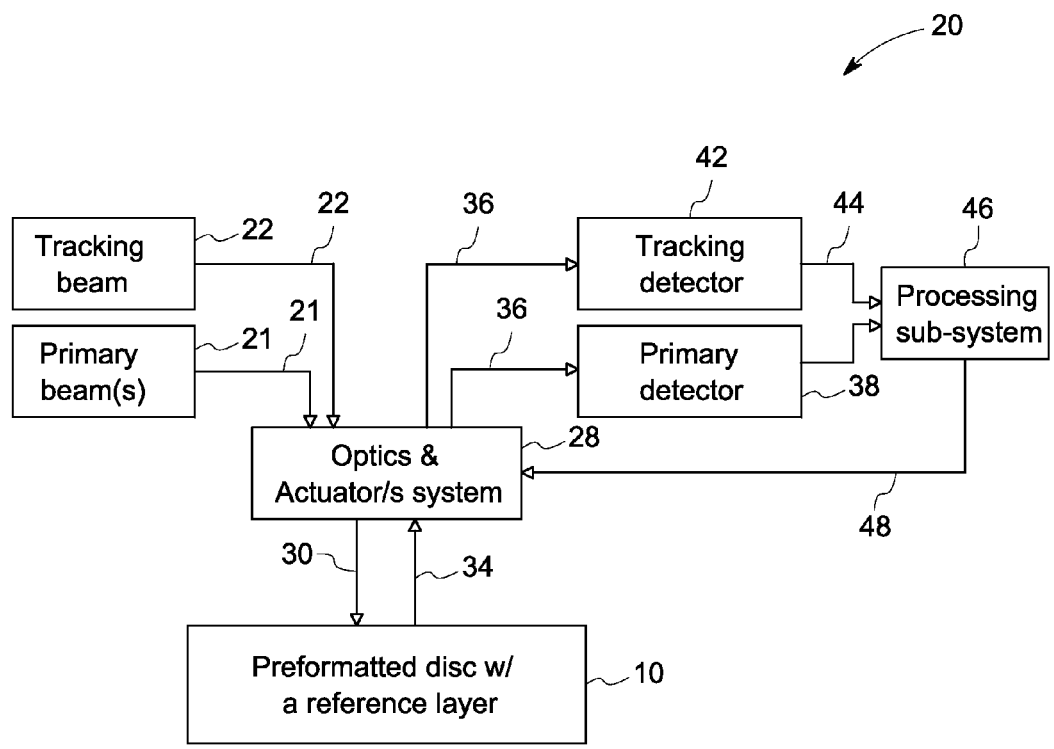
FIG. 2 is a block diagram representation of an exemplary micro-holographic recording system, in accordance with an embodiment of the invention.

An exemplary system 20 of recording micro-holograms to a holographic disk 10 is provided in the block diagram of FIG. 2. The holographic system 20 includes one or more primary beams 21 having a first wavelength and a tracking beam 22 having a second wavelength different from the first wavelength. The primary beam 21 and the tracking beam 22 may be passed through an optics and actuators system 28, which may include various optical and actuator devices configured to focus the focused primary beam and tracking beam 30 on a particular location of the disk 10. For example, the optics and actuator/s system 28 may focus the focused beams 30 to a particular data layer or data tracks 12 (FIG. 1) in the disk 10.

Micro-holograms may be recorded in the holographic disk 10 in illuminated spots of an interference pattern. In some embodiments, recorded micro-holograms may be retrieved from the disk 10 using the focused reflected primary beam 34. Reflections of the focused primary beam and tracking beam 34, referred to as the data reflections 36, may be received at a primary detector 38 and a tracking detector 42 for servo and signal detection. The detected data 44 is further input into a processing sub-system 46 for data analysis. Processing sub-system 46 also computes actuation signal 48 to control or actuate the optics and actuators system for improved focusing or alignment of the beams 21, 22 on the disk 10.

Figure 3:
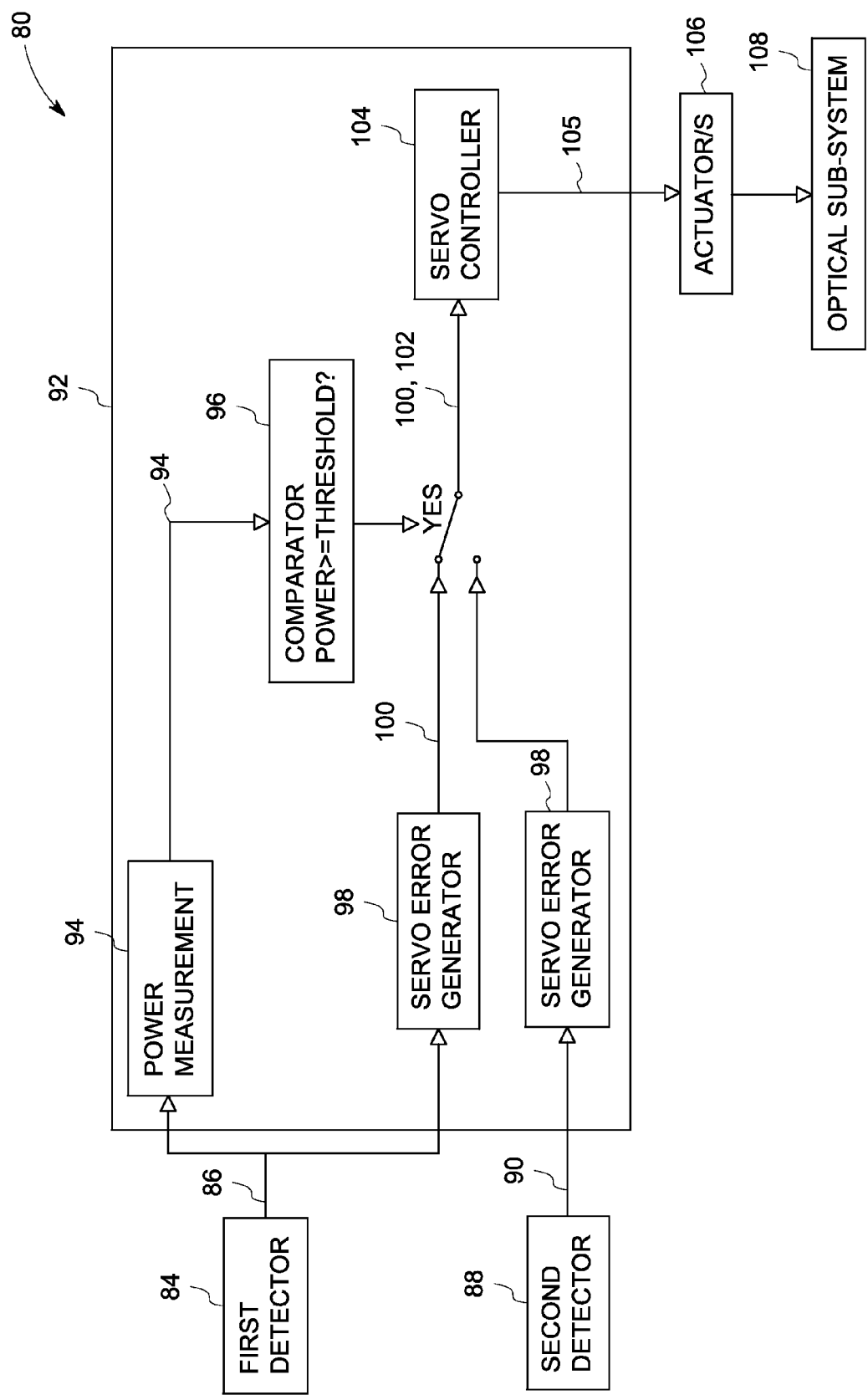
FIG. 3 is a block diagram representation of a system for servoing when reading out a recorded holographic disk or recording in a preformatted holographic disk in accordance with an embodiment of the invention.

FIG. 3 is a block diagram representation of a system 80 for servoing when reading out a recorded holographic disk or recording in a preformatted holographic disk 10 (FIG. 1). The system 80 includes a first detector 84 that detects a primary beam signal 86 of a reflected primary beam from a target data track of a target data layer of the holographic disk 10, wherein the primary beam (not shown) includes a first wavelength. In a particular embodiment, a power distribution of the primary beam is detected. A second detector 88 detects a tracking signal 90 of a reflected tracking beam (not shown) from a reference layer 13 (FIG. 1) of the disk 10. The reference layer includes at least one of a partially dichroic coating or a partially metallized coating. In a particular embodiment, the dichroic coating includes multiple dielectric layers of oxides and nitrides. In another embodiment, the metallized coating includes one of aluminum or gold or silver or their mixed alloys. In a particular embodiment, the tracking beam has a second wavelength different from the first wavelength. In a particular embodiment, the first wavelength of the primary beam includes a wavelength in the range between about 375 nm to about 650 nm. In another embodiment, the second wavelength of the tracking beam is in the range between about 400 nm to about 800 nm. In yet another embodiment, the first detector and the second detector include quadrant detectors. A processing sub-system 92 coupled to the first detector 84 compares power 94 of the primary signal 86 with a threshold value of power, as referenced by block 96. In parallel, a servo error generator 98 within the processing sub-system 92, generates a primary servo error signal 100 based upon the primary signal 86. Similarly, a tracking servo error signal 102 is generated based upon the tracking signal 90.

In an event that the power 94 is greater than the threshold value, the primary servo error signal 100 is input into a servo controller 104 that generates an actuation signal 105. The actuation signal 105 is input into one or more actuators 106 that actuate an optical sub-system 108 to focus the primary beam on a desired data track or layer. In an event that the power 94 is less than the threshold value, the tracking servo error signal 102 is input into the servo controller 104. The servo controller 104 generates the actuation signal 105 based upon the tracking servo error signal 102, that is further input into the one or more actuators 106 to actuate the optical sub-system 108 for precise focusing of the primary beam 21 (FIG. 2) on the target data layer. In an exemplary embodiment, the optical sub-system 108 includes an objective lens.

It should be noted that embodiments of the invention are not limited to any particular processor for performing the processing tasks of the invention. The term "processing sub-system," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

FIG. 4 is a block diagram representation of another exemplary system 110 for servoing holographic disk 10 (FIG. 1). The technique employed by system 110 differs from the system 80 in that initially the tracking beam is focused on the reference layer, and a tracking run-out profile is obtained that enables focusing of the tracking beam on the reference layer. Subsequently, the primary beam is focused based upon the obtained tracking run-out profile.

In the illustrated embodiment, in a learning phase, a first detector 112 detects a tracking signal 113 of a reflected tracking beam from a reference layer 13 (FIG. 1) of the holographic disk 10, wherein the tracking beam has a first wavelength and the reference layer includes at least one of a partially dichroic coating or a partially metallized coating. The tracking signal 113 detected is input into a processing sub-system 132 that includes a servo error generator 134. The servo error generator 134 generates a tracking servo error signal 135 that is input into a tracking servo controller 136. The tracking servo controller 136 generates a learned/observed tracking runout profile 140 that is further input into a primary servo controller 142. The tracking servo controller 136 also generates a tracking actuation signal 144 to one or more actuators 146. The actuators 146 actuate an optical sub-system 148 (equivalent to optics and actuator/s system 28 in FIG. 2) based upon the tracking actuation signal 144 to focus the tracking beam on the reference layer 13 (FIG. 1) of the disk 10. Furthermore, a primary signal 152 detected by a second detector 154 is input into the servo error generator 156 that generates a primary servo error signal 158. In one embodiment, the power distribution of the primary beam is detected. The primary servo error signal 158 is input into the primary servo controller 142. The primary servo controller 142 generates a primary actuation signal 164 based upon the learned tracking runout profile 140. The primary actuation signal 164 is input into the one or more actuators 146 that actuate the optical sub-system 148 to focus the primary beam on the target data layer.

In one embodiment, the first detector 112 and the second detector 154 include quadrant detectors. As in FIG. 4, in a particular embodiment, the first wavelength of the tracking beam includes a wavelength in the range between about 400 nm to about 800 nm. In another embodiment, the second wavelength of the primary beam is in the range between about 375 nm to about 650 nm.

FIG. 5 is a graphical illustration of an exemplary simulated learned tracking run-out profile 160 as discussed in FIG. 4. The run-out profile is equivalent to the learned tracking run-out profile 140 discussed in FIG. 4. The X-axis 152 represents time in seconds and the Y-axis 154 represents normalized amplitude. The graph 156 illustrates tracks 158 crossed over by a tracking laser or a primary laser over a period of time. Furthermore, the graph 162 (reference numeral 162 in FIG. 5) illustrates a primary servo-error signal 164 obtained at various intervals of time over different tracks 158. An exemplary real tracking run-out profile 166 is depicted over the various tracks 158, and the simulated learned run-out profile 160 is generated based on the tracking servo error signal, as discussed in FIG. 4. Furthermore, a residual run-out error 168 is generated based upon the primary servo-error signal to evaluate the servo performance. The simulation shows that the primary beam is focused on the target data layer with an error of +/−0.2 micrometers.

The various embodiments of a system and method for precise servoing described above thus provide a way to achieve a convenient and efficient means of directly focusing over layers/tracks of the holographic disk wherein data is to be recorded. Servoing directly over data layers provides an improved signal-to-noise ratio of a readout signal and eliminates stringent requirement on data layer spacing during replication and complex readout optics design to match the layer spacing during readout.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for servoing when reading out a recorded holographic disk or recording in a preformatted holographic disk, the method comprising:
   detecting a primary signal of a reflected primary beam from a target data track of a target data layer of the holographic disk, the primary beam of radiation comprising a first wavelength, wherein said detecting a primary signal comprises detecting a power distribution from the reflected primary beam;
   comparing a power measurement of the primary signal with a threshold value of power;
   detecting a tracking signal of a reflected tracking beam from a reference layer of the holographic disk in an event that the power measurement of the primary signal is below the threshold value of power, the tracking beam of radiation comprising a second wavelength, wherein said detecting a tracking signal comprises detecting a reflected power distribution from the reflected tracking beam;
   generating a servo error signal based upon the primary signal or the tracking signal; and
   actuating an optical sub-system based upon either of the primary servo error signal or the tracking servo error signal such that the primary beam focuses on the target data layer.

2. The method of claim 1, wherein said primary servo error signal or said tracking servo error signal is a focus error signal.

3. The method of claim 2, wherein said focus error signal is generated using astigmatic focusing method.

4. The method of claim 1, wherein said actuating the optical sub-system comprises actuating the optical sub-system based upon an actuation signal generated from the primary servo error signal or the tracking servo error signal.

5. The method of claim 1, wherein said second wavelength is different from the first wavelength.

6. A system for servoing when reading out a recorded holographic disk or recording in a preformatted holographic disk, the system comprising:
   a first detector configured to detect a primary signal of a reflected primary beam from a target data track of a target data layer of the holographic disk, the primary beam comprising a first wavelength, wherein the first detector is further configured to detect a power distribution of the reflected primary beam;
   a second detector configured to detect a tracking signal of a reflected tracking beam from a reference layer of the holographic disk the tracking beam comprising a second wavelength, wherein the second detector is further configured to detect a power distribution of the reflected tracking beam;
   a processing sub-system comprising:
      a comparator configured to compare a power measurement of the primary signal with a threshold value of power;
      at least one servo error generator configured to generate either a primary servo error signal based on the primary signal or a tracking servo error signal based on the tracking signal; and
      a servo controller configured to either generate an actuation signal based on the primary servo error signal in an event that the power measurement is greater than or equal to the threshold value, or generate an actuation signal based on the tracking servo error signal in an event that the power measurement is lesser than the threshold value; and
   an optical sub-system configured to actuate based upon the actuation signal such that the primary beam focuses on the target data layer.

7. The system of claim 6, wherein said first detector and said second detector comprise a quadrant detector.

8. The system of claim 6, wherein said optical sub-system comprises an objective lens.

9. The system of claim 6, wherein said first wavelength of the tracking beam comprises a wavelength in the range between about 400 nm to about 800 nm.

10. The system of claim 6, wherein said second wavelength of the primary beam comprises a wavelength in the range between about 375 nm to about 650 nm.

11. The system of claim 6, wherein the reference layer comprises at least one of a partially dichroic coating or a partially metallized coating.

12. The system of claim 6, wherein said primary beam comprises a reading beam for reading-out the recorded holographic disk or a recording beam for recording by erasure in the preformatted holographic disk.

13. The system of claim 6, further comprising a primary laser source emitting the primary beam.

14. The system of claim 6, further comprising a tracking laser source emitting the tracking beam.

* * * * *